United States Patent
Rondestvedt, Jr.

[15] 3,681,451
[45] Aug. 1, 1972

[54] AROMATIC ACID CHLORIDE PROCESS

[72] Inventor: Christian S. Rondestvedt, Jr., Wilmington, Del.

[73] Assignee: E. I. du Pont de Nemours and Company, Wilmington, Del.

[22] Filed: Nov. 10, 1969

[21] Appl. No.: 875,533

[52] U.S. Cl. ................................260/544 M
[51] Int. Cl. .....................................C07c 51/58
[58] Field of Search ............260/544 R, 524 S

[56] References Cited

UNITED STATES PATENTS 2,928,879  3/1960  Strickland ..................260/599

FOREIGN PATENTS OR APPLICATIONS 1,343,839  10/1963  France

OTHER PUBLICATIONS

Gould Mech. & Structural in Org. Chem. (1959) p. 731.

*Primary Examiner*—Lorraine A. Weinberger
*Assistant Examiner*—Richard D. Kelly
*Attorney*—Francis J. Crowley

[57] ABSTRACT

Process for preparing aromatic acid chlorides such as isophthaloyl chloride and terephthaloyl chloride, useful as intermediates for making polyester, polyamide and the like condensation polymers, which includes the steps of contacting an aromatic compound containing at least one trichloromethyl group bonded to an aromatic carbon atom with sulfur dioxide in the absence of added metallic compounds at a temperature of at least about 80° C. and at a pressure and for a time sufficient to convert at least one trichloromethyl group to an acid chloride group.

11 Claims, No Drawings

AROMATIC ACID CHLORIDE PROCESS

The subject invention relates to a process for converting trichloromethyl-substituted aromatic compounds to aromatic acid chlorides by reaction with sulfur dioxide alone or, optionally, in the presence of peroxide catalyst.

BACKGROUND

Aromatic acid chlorides are valuable intermediates, particularly poly acid chlorides, such as isophthaloyl chloride and terephthaloyl chloride, useful for making polyester, polyamide and the like condensation polymers. Economically attractive intermediates to the acid chlorides are trichloromethyl-substituted aromatic compounds, obtainable by chlorinating methyl-substituted aromatic compounds by methods wellknown to the art. The methods proposed heretofore, however, for converting the trichloromethyl compounds to the acid chlorides, notably hydrolysis, reaction with organic acids or salts thereof, or reaction with selected metal oxides, are not entirely satisfactory, particularly from the commercial standpoint of overall production cost.

U.S. Pat. No. 2,393,247 describes a method for making thionyl chloride by heating chloroform or carbon tetrachloride with sulfur dioxide in the presence of a Friedel-Crafts catalyst (polyvalent metal halide, e.g., $AlCl_3$) at 100° to 300° C. The disclosed reaction courses are:

a. $CHCl_3 + SO_2 \longrightarrow SOCl_2 + CO + HCl$ b. $CCl_4 + 2SO_2 \longrightarrow 2 SOCl_2 + CO_2$.

Reaction (b) also yielded phosgene, $COCl_2$, in small amounts, possibly by route (c):

c. $CCl_4 + SO_2 \longrightarrow SOCl_2 + COCl_2$.

That $COCl_2$ was not the major product may perhaps be explained by German Pat. No. 284,935 disclosure that $COCl_2$ and $SO_2$ react at 200° C. to yield $SOCl_2$ or $SCl_4$. Thus it appears that carbonyl chlorides in general are inherently unstable in the presence of $SO_2$ at elevated temperatures.

U.S. Pat. No. 2,856,425 describes converting aromatic trihalomethyl compounds to aromatic acid chlorides by heating (above 50° C. and preferably between 150° and 300° C.) with oxides of 4 th and 5 th group metals having atomic numbers in the 22 to 51 range, including specifically Ti, V, As, Zr and Sb.

The choice of oxide is apparently critical. The patent states that only the selected metal oxides give smooth reactions and pure products; that many other metal oxides react with trichloromethyl groups, but violently in many cases, with unwanted by-products resulting in major proportions. Furthermore "——the purity of the metal oxides profoundly affects the course of the reaction ——;" for example, titanium oxides which contain iron oxides or aluminum oxides give unsatisfactory results.

U.S. Pat. No. 3,411,886 discloses that ferric chloride catalyzes the reaction of sulfur dioxide with aromatic trichloromethyl compounds to produce thionyl chloride and aromatic acid chloride. It has been found, however, that ferric chloride tends to promote tar formation at the expense of product purity and yield at those some-what elevated temperatures. (80°–120° C.) Where reaction rates in this system first become commercially attractive, Ferric chloride use has the further drawback that the organic acid chloride becomes contaminated with iron compounds (generally colored) and requires careful fractional distillation for their removal.

U.S. Pat. No. 3,322,822 discloses chlorosulfonyl benzoyl chloride preparation by heating benzotrichlorides bearing at least one ring hydrogen with sulfur trioxide at 50° to 200° C. The benzotrichloride's trichloromethyl group is converted into a carbonyl chloride while its ring hydrogen is replaced by a chlorosulfonyl group. Thus the process appears limited to manufacture of chlorosulfonyl carbonyl chlorides.

BRIEF SUMMARY OF THE INVENTION

The subject process for preparing aromatic acid chlorides in general includes the steps of contacting an aromatic compound containing at least one trichloromethyl group bonded to an aromatic carbon atom (usually a benzene with one to three trichloromethyls on nonadjacent ring positions and zero to three other substituents taken from halo, alkyl, chloroalkyl, fluoroalkyl, alkoxyl or carbonyl chloride, said other substituents being preferably at positions nonadjacent to the trichloromethyls) with sulfur dioxide in the absence of added metallic reactants and/or catalysts at a temperature of at least about 80° C. and at a pressure and for a time sufficient to convert at least one trichloromethyl group to an acid chloride group; and recovering the resultant aromatic acid chloride.

A preferred embodiment includes conducting the above process in the presence of a free radical-generating organic peroxide such as benzoyl peroxide or di-tert. butyl peroxide in an amount (generally about 0.01–0.20 molecules per trichloromethyl group) to effectively increase the conversion rate of trichloromethyl groups to acid chloride groups.

In the catalyzed or uncatalyzed process, the temperature should be from at least about 80° C. to 350° C. (preferably 130°–350° C.) and the pressure at least about 200 p.s.i.g. to provide the desired degree of contact between $SO_2$ and the trichloromethyl group.

The preferred trichloromethyl compounds are the benzenes bearing one to two trichloromethyls on nonadjacent ring positions, such as 1,3-bis(trichloromethyl) benzene bearing zero to three ring chloro groups, 1,4-bis(trichloromethyl) benzene bearing zero to three ring chloro groups, and meta-trichlorotoluyl chloride bearing zero to three ring chloro groups; the corresponding isophthaloyl or terephthaloyl chloride being recovered from the reaction mass.

DETAILED DESCRIPTION OF THE INVENTION

This invention is based on the discovery that sulfur dioxide is highly effective for converting a wide variety of aromatic trichloromethyl compounds to their corresponding aromatic acid chlorides in good yields and purity without the presence of Friedel-Crafts' catalysts or metal oxides as required by prior art processes.

The invention is also based on further discoveries that certain materials, in small amounts, as more fully described hereinafter, exert pronounced beneficial effects such as lowering reaction temperatures and/or shortening reaction times.

Thionyl chloride, the byproduct in the process of this invention, is a well-known, widely useful industrial chemical. It is sufficiently volatile (more so than the metal halides and oxyhalides of the process of U. S. Pat. No. 2,856,425) to be readily and cleanly separated from the aromatic acid chloride reaction product, and is likewise obtained in high yields.

Thus, in employing readily available and relatively low cost sulfur dioxide as reagent and producing an economically valuable byproduct along with the desired aromatic acid chlorides, the subject process constitutes an important advance in the art.

The trichloromethyl compounds that can be converted into acid chlorides in the invention process may vary widely so long as the corresponding aromatic carbonyl chlorides are capable of existence and are sufficiently stable under the defined thermal conditions to be recovered from the reaction mass. They may be broadly represented as $(R)_mAr(CCl_3)_n$, where Ar stands for an aromatic nucleus, R is H or a substituent that does not interfere with the reaction or the products, $m$ and $n$ are integers of at least one each which together satisfy the valence of the aromatic nucleus, and the $CCl_3$ groups are on non-adjacent carbon atoms when $n$ is greater than one.

Thus the aromatic compounds may contain one or more trichloromethyl groups, normally one to three such groups per aromatic ring, and optionally may contain one or more other substituents inert to the acid chloride group under reaction conditions. Preferably the nuclear positions adjacent to at least one trichloromethyl will be free of substituents other than hydrogen. Included are compounds of the benzene, naphthalene, phenanthrene and anthracene series, also binuclear analogs thereof wherein two aryls, normally phenyls, with one or both carrying one or more trichloromethyl groups, are joined through an electron pair bond, an alkylene group such as methylene, ethylidene, propylidene or butylidene, a carbonyl group, or the like bridging group which is inert under the conditions of the reaction.

Non-interfering R substituents other than hydrogen that may be present along with the trichloromethyls in the compounds to be treated include: the halogens F, Cl, Br and I; alkyl, normally lower alkyl for reasons of availability, such as methyl, ethyl, isopropyl, tert-butyl; chloroalkyl other than trichloromethyl and normally lower chloroalkyl, such as chloromethyl, dichloromethyl and $\beta,\beta,\beta$-trichloroethyl; fluoroalkyl, such as fluoromethyl, difluoromethyl, trifluoromethyl, pentafluoroethyl, and perfluorobutyl; lower alkoxyl such as methoxy, ethoxyl, n-propoxyl, and n-butoxyl; and others such as carbonyl chloride, cyano and nitro.

The R substituents need not be completely unreactive. They need only be sufficiently inert to the carbonyl chloride compound produced in the reaction to allow its recovery. Thus there may be present carboxyl groups, which under the conditions of the reaction are converted to carbonyl chloride groups by reaction with the $SOCl_2$ byproduct. It should be noted that sulfur dioxide is known to oxidize aromatic side chain methyl groups to carboxylic groups at elevated temperatures. In the present process, however, the trichloromethyl group reacts preferentially with sulfur dioxide, particularly at the lower temperatures. Should side chain oxidation to carboxyl occur, the $SOCl_2$ byproduct would convert it to COCl.

It has also been discovered (as described in my co-pending application Ser. No. 875,541, filed concurrently herewith on Nov. 10, 1969, entitled Aromatic Acid Chloride Process) that sulfur dioxide ($SO_2$) is capable of oxidatively converting dichloromethyl groups ($-CHCl_2$) to acid chloride groups ($-COCl$), although more slowly than it converts trichloromethyl groups ($-CCl_3$) to $-COCl$ as described herein. Thus a compound such as $\alpha,\alpha,\alpha',\alpha'$-pentachloro-m-xylene, which contains a $-CHCl_2$ and a $-CCl_3$ group, can be converted almost exclusively to $\alpha,\alpha$-dichloro-m-toluyl chloride, by the process of this invention, with little or no conversion of the $-CHCl_2$ group. On further reaction with $SO_2$, however, for longer reaction times and/or at higher temperatures, alone or preferably in combination with thionyl chloride ($SOCl_2$), with or without oxygen (as described more fully in my above-referenced co-pending application Ser. No. 875,541 ), $\alpha,\alpha$-dichloro-m-toluyl chloride is converted into isophthaloyl chloride.

It has also been found that aromatic compounds that carry a methyl, chloromethyl or dichloromethyl group are also reactive toward $SOCl_2$ at elevated temperatures. Thus the mixture containing $\alpha,\alpha$-dichloro-m-toluyl chloride and $SOCl_2$, produced on reaction of $\alpha,\alpha,\alpha\alpha',\alpha'$-pentachloro-m-xylene with $SO_2$ in accordance with the present invention, can on further reaction for longer times or at higher temperatures produce isophthaloyl chloride by oxidative conversion and $\alpha,\alpha,\alpha,$-trichloro-m-toluyl chloride by chlorination. The $\alpha,\alpha,\alpha$-trichloro-m-toluyl chloride can in turn be converted to isophthaloyl chloride on subsequent reaction with $SO_2$, as already described, thus completing the conversion of the pentachloromethyl compound to the desired di-acid chloride.

When sulfur dioxide is employed in the absence of polyvalent metal chloride catalyst, electronegative substituents, such as Cl, COCl and additional $CCl_3$ groups, slow the $CCl_3$ to COCl conversion so that by controlling temperatures it is possible to stepwise convert poly-(trichloromethyl) compounds to the poly-acid chlorides. For example with two trichloromethyls present, as in 1,3-bis(trichloromethyl)benzene, reaction temperatures can be adjusted to stepwise yield the trichloromethyl-substituted benzoyl chloride. Such product can be recovered and the still unreacted trichloromethyl groups converted in a second separate reaction with non-metallic oxide or, if desired, in the same reactor by operating for longer times and/or at higher reaction temperatures. Similarly with three trichloromethyl groups present, as in 1,3,5-tris(trichloromethyl) benzene, the reaction can be controlled to yield one or more of bis(trichloromethyl)benzoyl chloride, trichloromethyl-isophthaloyl chloride and trimesoyl chloride.

Representative trichloromethyl compounds are benzotrichloride (trichloromethylbenzene), o-chlorobenzotrichloride, m-chlorobenzotrichloride, p-chlorobenzotrichloride, p-bromobenzotrichloride, p-iodobenzotrichloride, p-fluorobenzotrichloride, 3,4-dichlorobenzotrichloride, m-methyl-benzotrichloride ($\alpha,\alpha,\alpha\alpha+$-trichloromethyl-m-xylene), 3,4-di-methyl-benzotrichloride, p-tert.butylbenzotrichloride, p-trifluoromethylbenzotrichloride, m-dichloromethyl-benzotri-chloride ($\alpha,\alpha,\alpha,\alpha',\alpha'$-pentachloro-m-xylene), p-methoxybenzotrichloride, m-ethoxybenzotrichloride, p-n-butoxybenzotrichloride, m-cyanobenzotrichloride, p-nitrobenzotrichloride, mttrichloromethylbenzoyl chloride (α,α,α-trichloro-m-toluyl chloride), p-trichloromethylbenzoyl chloride, 1,3-bis(trichloromethyl)benzene (α,α,α,α',α',α'-hexachloro-m-xylene), 5-chloro-1,3-bis(trichloromethyl)benzene, 1,4-bis(trichloromethyl)benzene, 4-chloro-1,3-bis(trichloromethyl)benzene, 2,5-dichloro-1,4-bis(trichloromethyl)benzene, 2-chloro-1,3-bis(trichloromethyl)benzene, 2-chloro-1,4-bis(trichloromethyl)benzene, 4,5-dichloro-1,3-bis(trichloromethyl)benzene, 4,6-dichloro-1,3-bis(trichloromethyl)benzene, 2,5-dichloro-1,3-bis(trichloromethyl)benzene, 4,5,6-trichloro-1,3-bis(trichloromethyl)benzene, 1,3,5-tris(trichloromethyl)benzene (α,α,α,α',α',α',α'',α'',α''-nonachloromesitylene, 1-trichloromethyl-naphthalene, 1,5-bis(trichloromethyl)naphthalene, 2-trichloromethylphenanthrene, 1-trichloromethylanthracene, p-trichloromethyldiphenyl, p,p'-bis(trichloromethyl)diphenyl, bis(p-trichloromethylphenyl)methane, 2,2-bis(p-trichloromethylphenyl)propane, and p,p'-bis(trichloromethyl)benzophenone.

Trichloromethyl compounds of the benzene series, which may contain halo, alkyl, chloroalkyl, fluoroalkyl, alkoxyl and carbonyl chloride groups, represent an important reactant class, especially 1,3-bis(trichloromethyl)benzene and 1,4-bis(trichloromethyl)benzene, since the corresponding acid chlorides enjoy wide utility. It will be noted that the hexachloro meta-and p-xylenes obtained by side chain chlorinating the parent aromatic hydrocarbons may contain ring chlorinated derivatives, as exemplified above. Such ring chlorinated trichloromethyl-containing materials may also be converted simultaneously to the corresponding ring chlorinated acid chlorides by the process of this invention.

In the broad aspect of this process, an aromatic compound containing one or more trichloromethyl groups as described above and sulfur dioxide are heated together, with or without peroxide catalyst, to effect the transformation of one or more trichloromethyls to carbonyl chloride groups. The reaction stoichiometry may be represented as 1. $(R)_mAr(CCl_3)_n + nSO_2 \rightarrow (R)_mAr(COCl)_n + nSOCl_2$ where Ar R, $m$ and $n$ are as defined above.

Equation 1 requires one $SO_2$ molecule for each $CCl_3$ group to be converted. The actual quantity employed depends on the trichloromethyl compound, the operating temperatures and pressures and the degree of contact between the reactants during reaction.

The temperature, which should be sufficient to provide a liquid reaction mass and to effect the desired reaction, may vary widely. Normally it is in the range of at least 80° C. to 350° C. (preferably 130°–350° C.), with the actual temperature depending largely on the presence or absence of peroxide catalyst.

$SO_2$ normally boils at −10° C. so that for effective contact with the trichloromethyl component over the entire operating temperature range the reaction is generally conducted under agitation in closed vessels with at least one and usually not more than about 10 molecules of $SO_2$ per $CCl_3$ group, preferably 1.1 to five. Larger $SO_2$ proportions may be used but are normally not necessary. The reactor loading is adjusted such that the sulfur dioxide pressure in the free space is sufficiently great to maintain sulfur dioxide in the phase occupied by the trichloromethyl compound. Normally pressures of at least about 200 p.s.i.g. are used, preferably at least 500 p.s.i.g., the higher the better, with pressures greater than about 3500 p.s.i.g. seldom necessary. The means employed to agitate the reaction mass should be effective of course to disperse the sulfur dioxide in the reaction mass and provide intimate contact among the reactants.

The sulfur dioxide consumed during the reaction may be replenished by feeding additional $SO_2$ into the reactor, either into the reaction mass itself or into the free space normally present in closed systems. In one contemplated operating mode, the $SO_2$ is continuously fed to the otherwise closed reactor during the reaction to maintain a substantially constant, high $SO_2$ partial pressure in the vapor space and thus provide a high proportion of $SO_2$ dissolved (or intimately admixed) in the reaction mass liquid phase.

Temperatures of at least about 80° C. are employed to achieve practical rates. Preferably such temperature is at least 130° C. and not higher than 350° C. to minimize the possibility of side reactions, and most preferably is between 200° C. and 270° C. For example, in one typical uncatalyzed embodiment, 1,3-bis(trichloromethyl)benzene is heated under agitation with four to five molar proportions of $SO_2$ at 220° to 240° C. in a closed system such that the initial pressure (due essentially to $SO_2$) is between 1000 and 2000 p.s.i.g. Conversion to isophthaloyl chloride is substantially quantitative in two to four hours under these conditions.

The organic peroxide catalysts permit lower reaction temperatures (about 80°–170° C.) and/or shorter reaction times. Also, as there is less sulfur dioxide in the vapor space at the lower temperatures, another benefit is that smaller excesses over the theoretical sulfur dioxide amount may be used.

ORGANIC PEROXIDE CATALYSTS

Benzoyl peroxide and di-tert.butyl peroxide especially have been found to increase the conversion of $-CCl_3$ to $-COCl$ groups over that obtained with $SO_2$ alone. The peroxides are effective in small amounts, for example 0.01 to 0.2 mole per $CCl_3$ group, and at moderate temperatures, for example at 80° C. to 170° C.

The peroxides are considered to promote acid chloride formation by decomposing to free radicals, designated R· below, which initiate a chain reaction:

5. $Ar'CCl_3 + R· \rightarrow Ar'CCl_2· + RCl$

6. $Ar'CCl_2· + SO_2 \rightarrow Ar'COCl + ·SOCl$

7. $·SOCl + Ar'CCl_3 \rightarrow Ar'CC_2· + SOCl_2$.

Other free radical-generating organic peroxides, including dialkyl peroxides, diacyl peroxides and mixed alkyl acyl peroxides, may be used in this process with beneficial results. It will be appreciated that not all such peroxides will be equally effective and that the catalytic effect may vary with such factors as the decomposition (freesradical generating) temperature of the peroxide, the effectiveness of the radical intermediates in initiating the above reaction sequence, and the particular trichloromethyl compound employed.

Whatever the process embodiment employed, when the reaction is substantially complete, the reaction mass is normally cooled, vented to recover unreacted sulfur dioxide and the mixture distilled to recover first thionyl chloride then the higher boiling acid chloride, which if necessary may be distilled at reduced pressures as disclosed in British Pat. No. 946,491 and U.S. Pat. No. 2,856,425. Where the acid chloride is normally solid or not distillable it may be purified if desired by crystallization from melts or from solvent as is also well-known to the art.

One feature of this invention is that reaction solvents are normally not needed. They may be used, however, and in some cases afford substantial benefits by facilitating contact between the sulfur dioxide and the trichloromethyl compound. Useful diluents include thionyl chloride, phosphorus oxychloride, the aromatic acid chloride to be produced, and typical inert solvents such as chlorobenzene, ortho-dichlorobenzene and 1,2,4-trichlorobenzene.

Still another feature of the invention is that moisture need not be excluded from the reaction system since thionyl chloride efficiently scavenges water, yielding sulfur dioxide and hydrogen chloride (not detrimental to the process). Thus thionyl chloride may be advantageously added to the initial reaction charge where water contamination of the reactants or reactor is suspected or has inadvertently occurred.

EXAMPLES

The following examples are merely intended to illustrate the invention and are not intended to be in limitation thereof.

Other materials and conditions as described above may likewise be employed with advantageous results.

Quantities where given are in parts by weight; temperatures in °C.

Pressures, where not expressly stated, are always greater than 200 p.s.i.g.

Example 1

Benzotrichloride (58.8 parts) was charged to a shaker bomb lined with Hastelloy C, a corrosion resistant nickel alloy, and equipped with means for sensing internal reaction mass temperatures and free space pressures. The bomb was evacuated, cooled somewhat and sulfur dioxide (25.6 parts) was added. The quantities used correspond to a 1.33/1 $SO_2/C_6H_5CCl_3$ mole ratio and to a 350 grams/liter bomb loading density. The reaction was sealed, heated to 250° in about 0.5 hour and held at 250° for four hours, during which time the autogeneous pressure ranged from an initial 440 psig to a terminal 420 psig. The bomb was cooled to about 25°, vented to expel and recover unreacted $SO_2$, and the residual mass distilled to recover thionyl chloride in 77 percent yield, benzoyl chloride in 85 percent yield, and about five percent unreacted benzotrichloride.

In a comparative thermal run, 1,1,1,-trichloroethane (one molar proportion) and $SO_2$ (1.7 molar proportions) at a similar bomb loading density yielded substantially no acetyl chloride in seven hours at 250°.

Examples 2 to 6

The Example 1 procedure was repeated with various substituted benzotrichlorides under conditions tabulated below.

| Ex. | R-C$_6$H$_4$-CCl$_3$, R= | Loading Density, gms/liter | SO$_2$/-CCl$_3$ Mole Ratio | temp/ hours | acid chloride yield,% |
|---|---|---|---|---|---|
| 2 | O-Cl | 270 | 1.5 | 240/1 | 92 (a) |
| 3 | M-Cl | 270 | 1.5 | 240/1 | 90 (b) |
| 4 | p-Cl | 325 | 2.5 | 220/1 | 95 (c) |
| 5 | m-COCl | 810 | 2.0 | 230/3.5 | 94 (d) |
| 6 | 85 m-CHCl$_2$ +15 m-CCl$_3$ | 390 | 3.0 | 230/3 | 72 (e) |

(a) Based on 67% conversion; about 33% starting material recovered.
(b) In addition 4% of the starting material was recovered.
(c) 26% of the starting compound was recovered.
(d) The SOCl$_2$ yield was 86%.
(e) Mainly m-CHCl$_2$-C$_6$H$_4$COCl plus some m-C$_6$H$_4$(COCl)$_2$.

Examples 7–15

The Example 1 procedure was repeated with 1,3-bis-(trichloromethyl)benzene, designated HCMX, in a series of runs under the conditions tabulated below. After unreacted $SO_2$ was removed by venting the reactor, the reaction mass was distilled, first at atmospheric pressure at pot temperatures up to 210° C. to recover thionyl chloride in yields ranging from about 70 to 91 percent then at reduced pressures in a simple distillation to recover isophthaloyl chloride (b.p. 145°/15 mm; 180°/30 mm) in high yields and purity. In some runs conversion to the diacid chloride (designated IC1) was incomplete and the mono acid chloride, α,α,α-trichloro-m-toluyl chloride (TCTC), was also obtained as noted below.

| Ex. | HCMX Parts | SO$_2$/HCMX Mole Ratio | temp/ hours | Press. Range, Psig. | Acid Chloride Yield, % |
|---|---|---|---|---|---|
| 7 | 31 | 3.0 | 208/5.5 | 750-475 | 81 IC1 |
| 8 | 63 | 2.5 | 222/5.5 | 950-525 | 94 IC1 |
| 9 | 63 | 5.0 | 230/2 | 500-490 | 96 IC1 |
| 10 | 155 | 2.6 | 250/2 | 1590-1000 | 97 IC1 |
| 11 | 63 | 3.0 | 270/8 | — | 66 IC1 28 TCTC |
| 12 | 63 | 3.0 | 300/2 | — | 63 IC1 34 TCTC |
| 13 | 63 | 3.0 | 330/1 | — | 60 IC1 37 TCTC |
| 14 | 63 | 2.5 | 195/7 | — | 15 IC1 59 TCTC 26 HCMX |
| 15 | 63 | 7.5 | 150/56 | — | 99 IC1 |

The low conversion to di-acid chloride in Example 14 is attributed mainly to the relatively short reaction time at 195°. Higher conversions may be obtained by increasing the time and/or the $SO_2$ content, as in Example 15. In Examples 11 to 13 the low conversions to di-acid chloride are attributed to decreased $SO_2$ solubility at 270° to 330° C. Higher conversions at these high temperatures may be obtained with higher $SO_2$ loadings or higher loading densities at the same $SO_2$/HCMX mole ratios.

The isophthaloyl chloride of Examples 7 to 10 contained less than five percent mono-acid chloride. The di- and mono-acid chlorides are separable by distillation. For example distillation of any of the above products in a 1inch ×22 inch heated corrosion-resistant packed column yields polymer grade isophthaloyl chloride, i.e., material essentially free from mono-functional acid chloride.

Example 16

The procedure of Examples 7 to 15 was repeated with 1,3-bis(trichloromethyl)benzene and five molar proportions of sulfur dioxide and with heating at 80° to 110° C. for 36 hours. Isophthaloyl chloride and meta-trichlorotoluyl chloride, along with unreacted bis(trichloromethyl)benzene, were recovered from the reaction mixture.

Example 17

The Example 1 procedure was repeated with 1,4-bis-(trichloromethyl)benzene and 2.6 molar proportions of sulfur dioxide. The mixture was heated at 235° for three hours during which time the autogenous pressure ranged from 2600 to 1080 p.s.i.g. Terephthaloyl chloride (b.p. 111°/20 mm Hg) was obtained in 92 percent yield on distillation at reduced pressures.

Example 18

The procedure of Examples 7–15 was repeated with 157 parts of 4-chloro-1,3-bis(trichloromethyl)benzene and 96 parts of sulfur dioxide heated at 220° to 230° for five hours. The conversion of the trichloromethyl compound to product was substantially complete and 4-chloro-isophthaloyl chloride was obtained by distillation at reduced pressures (b.p. 138°/10 mm HG) in 94 percent yield.

Example 19

The procedure of Examples 7 to 15 was repeated, employing 2-chloro-1,3-bis(trichloromethyl)benzene (0.2 mole) and sulfur dioxide (1.5 moles) and heating at 225° for six hours. Distillation of the reaction mixture under reduced pressure yielded a mixture containing 2-chloro-isophthaloyl chloride (57 percent), 2-chloro-3-trichloromethyl-benzoyl chloride (40 percent) and unreacted starting compound (about two percent).

Example 20

1,3-Bis(trichloromethyl)benzene (0.2 mole), sulfur dioxide (1.0 mole) and di-tert. butyl peroxide (0.0162) were mixed and heated at 140°–155° for seven hours in the reactor of Example 1. The conversion of $CCl_3$ to $COCl$ groups was 42 percent.

Without the peroxide present the conversion is less than 30 percent under these conditions.

Example 21

A. Preparation of $\alpha,\alpha,\alpha$-trichloro-m-toluyl chloride.

67 Parts (0.3 mole) of $\alpha,\alpha$-dichloro-m-toluyl chloride (produced as in Example 6 from $\alpha,\alpha,\alpha,\alpha'\alpha'$-penta-chloro-m-xylene and 54 parts (0.45 mole) of thionyl chloride were mixed and heated at 240° for four hours, then distilled under reduced pressure to recover, as forerun, a mixture of $SOCl_2$ and $S_2Cl_2$ and 64 parts of organic distillate analyzing 29 percent $\alpha,\alpha,\alpha$-trichloro-m-toluyl chloride, 26 percent isophthaloyl chloride and 45 percent unreacted $\alpha,\alpha$-dichloro-m-toluyl chloride. This product mixture was again heated with 36 parts (0.3 mole) $SOCl_2$ for four hours at 240°. The resulting product, 58 parts distilled, contained 40 percent $\alpha,\alpha,\alpha$-trichloro-m-toluyl chloride, about 60 percent isophthaloyl chloride and practically nil $\alpha,\alpha$-dichloro-m-toluyl chloride.

B. Completing Conversion of $\alpha,\alpha,\alpha$-trichloro-m-toluyl Chloride to Isophthaloyl Chloride.

The above product, 58 parts, was heated with 48 parts (0.75 mole) $SO_2$ under autogeneous pressure for five hours at 230°, then distilled to yield about 10 parts $SOCl_2$ and 46 parts high purity isophthaloyl chloride, b.p. 130°–135° at 13 mm Hg pressure.

Overall, substantially complete conversion of $\alpha,\alpha,\alpha,\alpha',\alpha'$-pentachloro-m-xylene may be obtained, in the same reactor: first by heating with $SO_2$ in the presence or absence of $SOCl_2$ until conversion to $\alpha,\alpha$-dichloro-m-toluyl chloride and $SOCl_2$ is substantially complete; then adding $SOCl_2$ as required and continuing to heat until the dichloro-m-toluyl chloride is converted to isophthaloyl chloride and $\alpha,\alpha,\alpha$-trichloro-m-toluyl chloride; followed by venting HCl by-product, adding $SO_2$ and again heating to convert the trichloro-m-toluyl chloride to isophthaloyl chloride; and recovering isophthaloyl chloride.

As seen from the foregoing description and examples, the subject invention provides a novel, economically attractive process for converting aromatic $CCl_3$ groups to $COCl$ groups which avoids many of the disadvantages of the prior art methods.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing aromatic acid chlorides which comprises contacting an aromatic compound having one or more trichloromethyl groups bonded to nonadjacent aromatic carbon atoms with sulfur dioxide in the absence of added metallic compounds at a temperature of from 80° to about 350° C. and at a pressure of at least 200 psig and for a time sufficient to convert at least one trichloromethyl group but insufficient to convert chlorinated methyl groups other than trichloromethyl groups to an acid chloride group; and recovering an aromatic acid chloride.

2. Claim 1 wherein said aromatic compound is a benzene bearing one to two trichloromethyl groups on nonadjacent ring positions and zero to three other substituents selected from halo, alkyl, chloroalkyl, fluoroalkyl, alkoxyl and carbonyl chloride.

3. Claim 2 wherein the aromatic compound is selected from the group consisting of 1,3-bis(trichloromethyl)benzene bearing zero to three ring chloro groups, 1,4-bis (trichloromethyl)benzene bearing zero to three ring chloro groups, and meta-trichlorotoluyl chloride bearing zero to three ring chloro groups.

4. Claim 2 wherein all ring positions adjacent to said trichloromethyl groups are unsubstituted.

5. Claim 1 wherein
   a. the sulfur dioxide is present in an amount of one to 10 molecules per trichloromethyl group;
   b. the temperature is 80°–350° C.; and
   c. the pressure is at least about 200 p.s.i.g.

6. Claim 5 wherein the process is conducted in a closed system under agitation.

7. Claim 6 wherein a. the sulfur dioxide is present in an amount of 1.1–5 molecules per trichloromethyl group;
b. the temperature is 130°–350° C.; and
c. the pressure is at least 500 p.s.i.g.

8. Claim 7 wherein the temperature is 200°–270° C.

9. Claim 6 wherein the process is conducted in the presence of a free radical-generating organic peroxide in an amount to effectively increase the conversion rate of trichloromethyl groups to acid chloride groups.

10. Claim 9 wherein said peroxide is present in an amount of about 0.01–0.20 moles per trichloromethyl group.

11. The process which consists essentially of contacting 1,3-bis(trichloromethyl)benzene with two to five molar proportions of $SO_2$ in the presence of 0.02 to 0.40 molar proportions of di-tert.butyl peroxide at 80°–170° C. and at least 200 p.s.i.g. for a time sufficient to substantially convert the trichloromethyl groups to —COCl groups; and recovering isophthaloyl chloride.

* * * * *